United States Patent [19]

O'Connor

[11] Patent Number: 4,796,843
[45] Date of Patent: Jan. 10, 1989

[54] CABLE TRIPOD SPREADER

[76] Inventor: Chadwell O'Connor, 2024 Galaxy Dr., Newport Beach, Calif. 92660

[21] Appl. No.: 116,960

[22] Filed: Nov. 5, 1987

[51] Int. Cl.⁴ .......................................... F16M 11/38
[52] U.S. Cl. .................... 248/168; 242/107.6
[58] Field of Search ............... 248/166, 168, 169, 170, 248/171, 188.6, 329, 330.1, 334.1; 108/128; 242/107.6

[56] References Cited

U.S. PATENT DOCUMENTS

| | | | |
|---|---|---|---|
| 686,006 | 11/1901 | McConnell | 248/169 X |
| 1,244,445 | 10/1917 | Pratt | 242/107.6 |
| 1,456,356 | 5/1923 | Bentley | 248/169 X |
| 2,168,675 | 8/1939 | Lofgren | 242/107.6 |
| 2,632,609 | 3/1953 | Kirby | 242/107.6 |
| 2,759,685 | 8/1956 | Flippen | 242/107.6 |
| 3,100,608 | 8/1963 | Goldfarb | 248/107.6 X |
| 3,715,526 | 2/1973 | Blanch | 242/107.6 X |
| 3,871,607 | 3/1975 | Pile . | |
| 4,196,881 | 4/1980 | Davidson . | |
| 4,640,482 | 2/1987 | Rogers | 248/168 |
| 4,666,112 | 5/1987 | Jaumann | 248/169 |

FOREIGN PATENT DOCUMENTS

| | | | |
|---|---|---|---|
| 2913591 | 10/1979 | Fed. Rep. of Germany | 242/107.6 |
| 1396584 | 3/1965 | France | 248/168 |
| 23454 | 7/1962 | German Democratic Rep. | 248/170 |
| 157705 | 10/1932 | Switzerland | 248/168 |

Primary Examiner—J. Franklin Foss
Assistant Examiner—Robert A. Olson
Attorney, Agent, or Firm—Leydig, Voit & Mayer

[57] ABSTRACT

The legs of a tripod are held in support position against further spreading by a flexible cable that is unspooled from a spring biased drum. The spring bias will respool the cable when the tripod legs are collapsed. The drum is in a housing fixed on one of the tripod legs, and the housing includes a locking device for locking rotation of the drum so as to fix the effective length of the cable and thus hold the legs to the position set by the cable length.

3 Claims, 2 Drawing Sheets

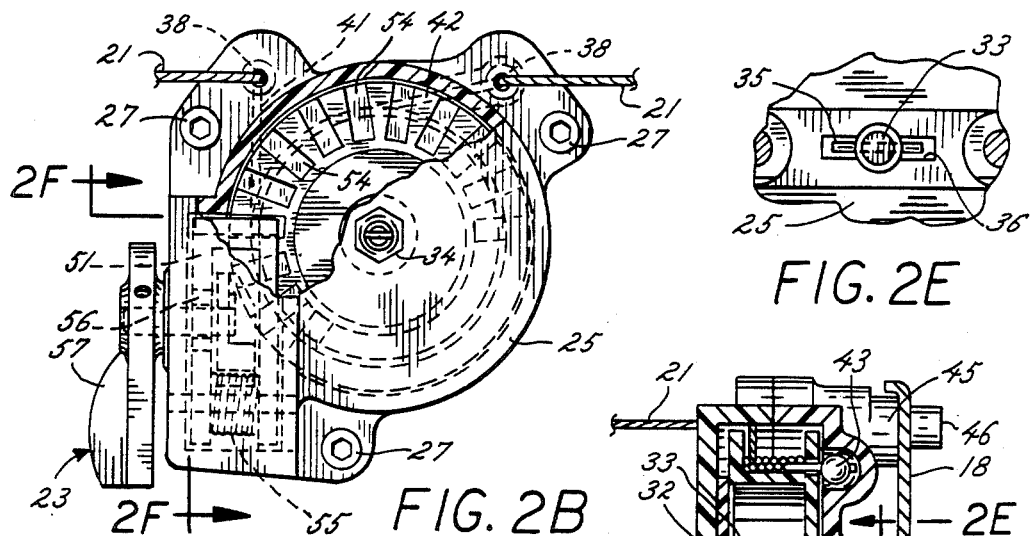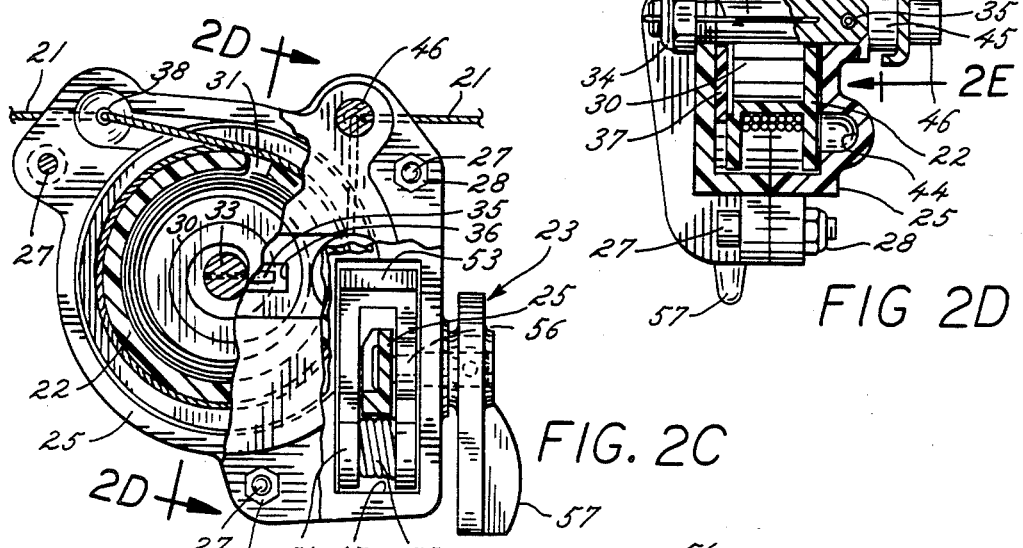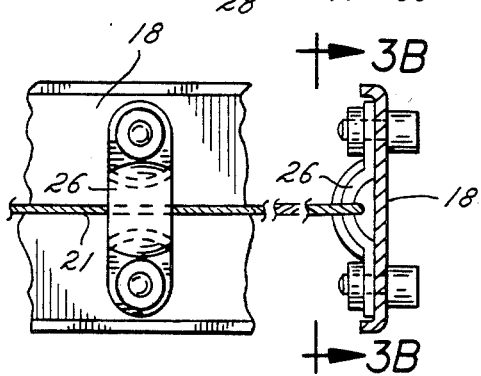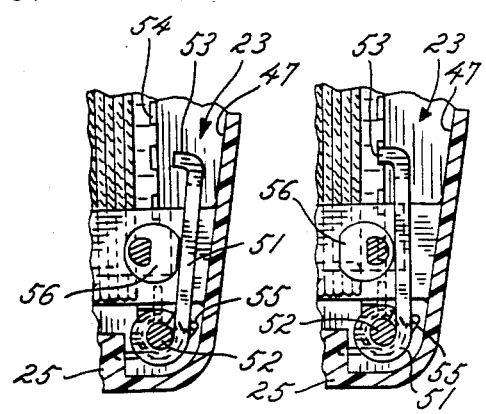

CABLE TRIPOD SPREADER

BACKGROUND

This invention relates generally to instrument supporting tripods and more specifically concerns a spreader to restrict outward movement of the tripod legs.

When using a tripod to support an instrument, such as a camera, it is desirable to control the outward swinging movement of the tripod legs to prevent collapse of the assembly. So called spreaders are sometimes used to interconnect the lower portions of the tripod legs. While such devices hold the legs in their spread, setup position, their purpose is the opposite of spreading, it is rather to prevent the excessive spread of the legs and collapse of the tripod.

Conventional spreaders are usually interconnected rigid rods, and therefore they constitute yet another cameraman's accessory to be packed, unfolded, installed, removed, refolded and repacked.

It is the aim of the invention to provide a tripod spreader that, once mounted on a tripod, becomes an integral part of the tripod which can be utilized or not as the tripod user wishes.

Another object of the invention is to provide a spreader of the kind characterized above that is easily controlled by the user from a standing position and using only one hand.

A further object is to provide a spreader as described above which is versatile, allowing the user to lock the legs after setting, to maintain the given leg spread after the legs have been folded together for movement, to lock the legs in their folded together relationship, or to exert no holding or locking function on the legs.

It is also an object to provide a spreader of the foregoing character which utilizes well known elements so as to be economical to manufacture and reliable in operation.

SUMMARY

The spreader includes a housing mounted on one leg of the tripod and containing a spring biased drum on which both ends of a flexible cable are spooled, leaving an intermediate loop of cable that is linked to the other two tripod legs by passing through cable guides. A positive detent type lock is provided for the drum. With the drum unlocked, the cable can be unspooled from the drum against the drum biasing force, which increases the cable loop size until the tripod legs are spread to the desired support position. The drum can then be locked to prevent further tripod leg spreading. When the tripod legs are again collapsed, and the drum unlocked, the drum biasing force respools the cable on the drum.

DRAWINGS

Other objects and advantages of the invention will become apparent upon reading the following detailed description and upon reference to the drawings, in which:

FIG. 2B is an elevation taken along line 2B—2B in FIG. 2A with portions broken away;

FIG. 2C is an elevation taken along the line 2C—2C in FIG. 2A with portions broken away;

FIG. 2D is a section taken along the line 2D—2D FIG. 2C;

FIG. 2E is a fragmentary section taken along the line 2E—2E in FIG. 2D;

FIGS. 2F and 2G are fragmentary sections taken along the line 2F—2F in FIG. 2B with operating parts shown in differing positions;

FIG. 3A is an enlarged section taken along the line 3—3 in FIG. 1; and

FIG. 3B is a fragmentary elevation taken along the line 3B—3B in FIG. 3A.

DESCRIPTION

Figure 1:
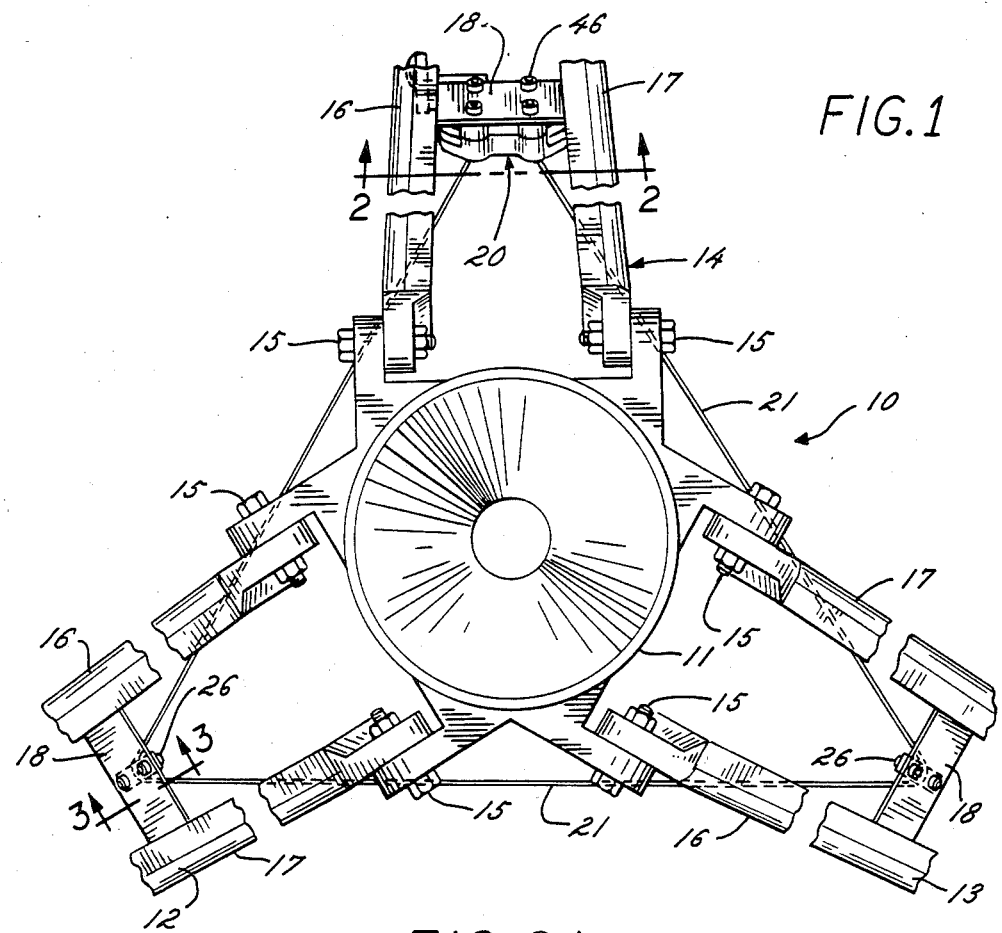
FIG. 1 is a fragmentary top plan of a tripod on which is a spreader embodying the invention.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawings, there is shown an instrument supporting tripod 10 including a tripod head 11 to which three tripod legs 12, 13 and 14 are pivoted by nut and bolt assemblies 15. The illustrated tripod legs 12-14 are formed of two elongated extruded bars 16 and 17, and brackets 18 are riveted between the bars 16, 17 at points well spaced from the head 11 so as to rigidify the leg structure.

Figure 2A:
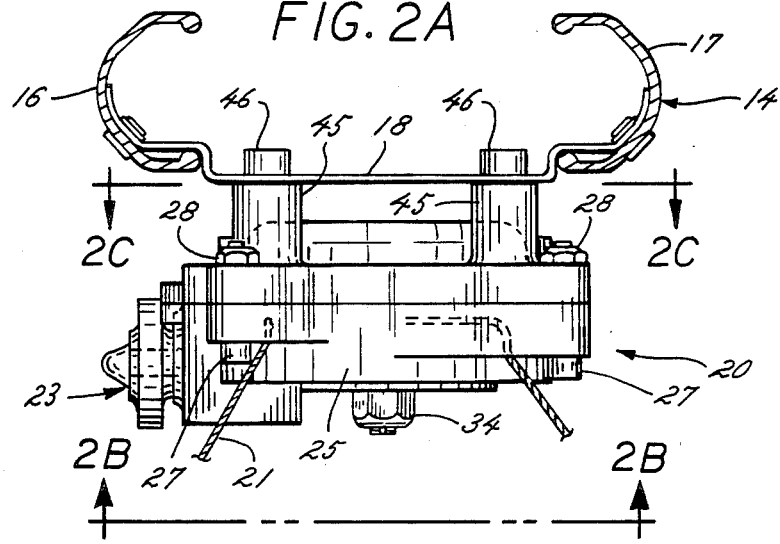
FIG. 2A is a section of the tripod leg taken approximately along the line 2—2 in FIG. 1, slightly enlarged, and showing the top of the spreader housing.

In accordance with the invention, a spreader 20 including a flexible cable 21 interconnect the legs 12-14, the cable 21 is spooled on a spring biased drum 22 (see FIG. 2C) so that the spring bias will spool the cable 21 on the drum, and a manually operable locking device 23 is provided to positively prevent rotation of the drum 22. Preferably, both ends of the cable 21 are secured to and spooled on the drum 22, so that the cable defines an intermediate loop. The drum 22 is journaled in a housing 25 secured to the leg 14, and the cable loop is connected to the other two legs 12, 13 by passing through cable guides 26 secured to the brackets 18 on those legs.

The housing 25 has two parts which mate and enclose the drum 22 and the locking device 23, with the housing parts being held together by bolts 27 and nuts 28. The drum 22 is hollow and encloses a flat band spiral spring 30 whose outer end is anchored in a drum slot 31 and whose inner end is fixed by passing through a slot 32 in an arbor 33. The arbor 33 journals the drum 22, is held in place by a lock nut 34, and is prevented from rotation by a roll pin 35 passing through the arbor 33 and seated in a slot 36 in the housing 25. A cover disc 37 on the drum 22 closes in the spring 30. It can be seen that the initial tension exerted by the spring 30 can be adjusted by removing the lock nut 34, sliding the arbor 33 axially so that the roll pin 35 clears the slot 36, and turning the arbor, as with a screwdriver in the slot 32, so as to wind the spring 30 into a more compressed configuration. When the desired tension is reached, the arbor 33 can again be slid axially until the roll pin 35 fits in the slot 36 and the lock nut 34 replaced. This initial tensioning of the spring 30 will of course be done with the drum 22 itself held in locked position.

The cable 21, preferably metal rope, passes into the housing 25 through sleeves 38 welded into the plastic forming the housing 25 so that the sleeves 38 protect the housing material from the effect of the sliding metal cable. At one side, the cable runs straight down at 41 to the drum 22, and at the other side the cable runs at 42 partially across the housing and to the drum 22. The ends of the cable are secured to balls 43, only one of which is shown, after passing through holes in the drum walls so as to anchor the cable ends on the drum (see FIG. 2D). One housing part is formed with an annular recess 44 to allow the balls 43 to rotate with the otherwise closely enclosed drum, and this housing part is also formed with four projections 45 forming mounting studs for screws 46 securing the housing 25 to the bracket 18.

The opposite housing part is formed with a chamber 47 enclosing the operating parts of the locking device 23, which include a lever 51 pivoted on a shaft 52 and having a dog portion 53 adapted to engage peripheral teeth 54 on the outer face of the drum 22 for positive detent locking. To operate the locking device 23, a torsion spring 55 biases the lever 51 counterclockwise in FIGS. 2F and 2G to hold the dog portion 53 in engagement with the drum teeth 54, and a cam 56 on the same shaft as, and operated by, a thumb lever 57 pushes the lever 51 against the bias of the spring 55 when the thumb lever 57 is turned so as to clear the dog portion 53 from an engaged tooth 54. This obviously unlocks the drum.

The various modes of operating the spreader 20 can now be readily seen. In the FIG. 1 configuration with the drum 22 locked, further outward spreading movement of the tripod legs 12–14 is prevented thereby avoiding collapse of the assembly. If the user wishes to fold the tripod legs into their parallel configuration for transport, this can readily be done and the cable 21 will simply loop loosely from the housing 25 through the cable guides 26. By leaving the drum in its locked position while the tripod is moved, when a new position is reached and the tripod legs are spread the same length of cable will insure that the new setup will be substantially the same as the old. Alternatively, with the tripod legs brought to parallel transport position, the user may rotate the thumb lever 23 so as to release the drum lock, whereupon the coiled and tensioned spring 30 will rotate the drum so as to respool the cable 21. When the cable loop is as small as it can be made considering its interconnection with the cable guides 26, operating the locking device 21 so as to lock the drum will have the effect of securing the tripod legs in their transport position, making it more convenient to handle the tripod.

Obviously, the size of the loop formed by the cable 21 can be selected by the user so as to restrain the tripod legs at the desired position. However, if the effect of the spreader 20 is not desired at all, the locking device 23 can simply be left in its unlocked state and the cable 21 will run into and out of the housing 25 without interfering with or controlling the position of the tripod legs.

It will be seen that the spreader 20 can be operated by the operator from a standing position and that the spreader 20, once mounted, becomes an integral part of the tripod not requiring separate handling. Spring and drum devices of this general nature are commonly used to control measuring tapes and hence such parts are readily and economically available, and are quite reliable.

I claim as my invention:

1. An instrument supporting tripod comprising, in combination, three legs adapted to be supported from a substantially parallel transport position to a spread support position, means interconnecting said legs including a flexible cable, a spring biased drum for receiving said cable in spooled relation, said spring bias being sufficient to drive the drum to spool on said cable after the cable has been pulled from the drum as the legs move to said spread support position, a locking device for positively preventing rotation of said drum, and means for operating said locking device to lock or release said drum.

2. An instrument supporting tripod comprising, in combination, three legs adapted to be supported from a substantially parallel support position to a spread support position, a spring biased drum journalled on one of said legs, a flexible cable spooled on said drum and connected to the other two of said legs, said spring bias being sufficient to drive the drum to spool on said cable after the cable has been pulled from the drum and said legs moved to said spread support position, a locking device for positively preventing rotation of said drum, and means for operating said locking device to lock or release said drum.

3. The combination of claim 2 in which both ends of said cable are secured to and spooled on said drum with the cable defining an intermediate loop that is linked to said other two legs.

* * * * *